US011427253B2

United States Patent
Riikonen et al.

(10) Patent No.: US 11,427,253 B2
(45) Date of Patent: Aug. 30, 2022

(54) METHOD AND SYSTEM FOR COLLISION AVOIDANCE

(71) Applicant: Volvo Car Corporation, Gothenburg (SE)

(72) Inventors: Mikael Riikonen, Gothenburg (SE); Derong Yang, Västra Frölunda (SE); Martin Idegren, Gothenburg (SE); Mats Jonasson, Partille (SE); Rickard Nilsson, Hisings Kärra (SE)

(73) Assignee: Volvo Car Corporation, Gothenburg (SE)

(*) Notice: Subject to any disclaimer, the term of this patent is extended or adjusted under 35 U.S.C. 154(b) by 165 days.

(21) Appl. No.: 16/571,373

(22) Filed: Sep. 16, 2019

(65) Prior Publication Data

US 2020/0086919 A1 Mar. 19, 2020

(30) Foreign Application Priority Data

Sep. 18, 2018 (EP) ..................................... 18195120

(51) Int. Cl.
*B62D 15/02* (2006.01)
*B60W 30/09* (2012.01)
*B60T 7/12* (2006.01)

(52) U.S. Cl.
CPC ............ *B62D 15/0265* (2013.01); *B60T 7/12* (2013.01); *B60W 30/09* (2013.01); *B60T 2201/022* (2013.01); *B60W 2520/125* (2013.01); *B60W 2520/14* (2013.01)

(58) Field of Classification Search
None
See application file for complete search history.

(56) References Cited

U.S. PATENT DOCUMENTS

| 7,016,783 | B2 |   | 3/2006 | Hac et al. | |
|---|---|---|---|---|---|
| 8,914,213 | B2 | * | 12/2014 | Chimner | B60W 30/02 |
|   |   |   |   |   | 701/73 |
| 9,682,703 | B2 | * | 6/2017 | Okita | G08G 1/165 |

(Continued)

FOREIGN PATENT DOCUMENTS

| DE | 102014206341 A1 * | 10/2015 | ........ B60W 50/0097 |
|---|---|---|---|
| EP | 1201520 A1 | 5/2002 | |

(Continued)

OTHER PUBLICATIONS

Mar. 6, 2019 European Search Report issue on International Application No. EP18195120.

*Primary Examiner* — Jeff A Burke
*Assistant Examiner* — Jerrod Irvin Davis
(74) *Attorney, Agent, or Firm* — Clements Bernard Walker; Christopher L. Bernard (57) ABSTRACT

The present invention relates to a method for collision avoidance for a host vehicle, the method comprising: detecting a target in the vicinity of the vehicle; determining that the host vehicle is travelling on a collision course with the target; detecting a user initiated steering action for steering the vehicle towards one side of the target; determining a degree of understeering of the host vehicle; when the degree of understeering exceeds a first understeering threshold, controlling a steering control system of the vehicle to counteract the user initiated steering action to thereby reduce the degree of understeering. The invention further relates to an evasive steering system.

11 Claims, 7 Drawing Sheets

(56) References Cited

U.S. PATENT DOCUMENTS

| | | | |
|---|---|---|---|
| 2007/0010945 A1* | 1/2007 | Shoda | G08G 1/163 |
| | | | 701/301 |
| 2011/0196576 A1* | 8/2011 | Stahlin | B62D 15/025 |
| | | | 701/41 |
| 2012/0109445 A1* | 5/2012 | Tan | B60W 40/114 |
| | | | 701/29.2 |
| 2016/0046287 A1* | 2/2016 | Owen | B60W 30/045 |
| | | | 701/43 |
| 2016/0280265 A1* | 9/2016 | Hass | B62D 15/0265 |
| 2018/0237003 A1* | 8/2018 | Watanabe | B60W 30/18145 |
| 2018/0281791 A1* | 10/2018 | Fukaya | B60W 30/0956 |
| 2020/0047749 A1* | 2/2020 | Morotomi | B60W 50/082 |
| 2021/0070287 A1* | 3/2021 | Takahashi | G08G 1/16 |

FOREIGN PATENT DOCUMENTS

| | | |
|---|---|---|
| EP | 1251060 A2 | 10/2002 |
| EP | 2838772 A1 | 2/2015 |
| EP | 3057848 A1 | 8/2016 |
| WO | 2013158252 A1 | 10/2013 |
| WO | 2015057147 A1 | 4/2015 |

\* cited by examiner

METHOD AND SYSTEM FOR COLLISION AVOIDANCE

CROSS-REFERENCE TO RELATED APPLICATION

The present disclosure claims the benefit of priority of co-pending European Patent Application No. 18195120.3, filed on Sep. 18, 2018, and entitle "METHOD AND SYSTEM FOR COLLISION AVOIDANCE," the contents of which are incorporated in full by reference herein.

FIELD OF THE INVENTION

The present invention relates to a method for collision avoidance and to an evasive steering system configured to provide an intervening action for a host vehicle.

BACKGROUND OF THE INVENTION

Todays vehicles are becoming increasingly advanced with regards to safety, both in terms of the structure of the vehicle and control functions for the vehicle. Most modern vehicles are equipped with advanced driver assist systems which aim to assist the driver in a driving process. One example of an advanced driver assist system is cruise control configured to maintain the speed of the vehicle.

More advanced adaptive cruise control systems are able to dynamically adapt the speed of the vehicle, for example slowing down for lead vehicles. Furthermore, some advanced driver assist systems may be configured for collision avoidance such as auto-braking the vehicle under some circumstances, or a steer assist to steer away from the object in the way of the vehicle if a collision is predicted.

Although many of the advanced driver assist systems provide useful driver assistance in the event of an imminent collision, there is still room for improvement with regards to avoiding accidents in vehicle collision situations.

SUMMARY

In view of above-mentioned prior art, it is an object of the present invention to provide an improved method for collision avoidance for a host vehicle. There is also provided an improved evasive steering system configured to provide an intervening action for a host vehicle.

According to a first aspect of the invention, there is provided a method for collision avoidance for a host vehicle, the method comprising: detecting a target in the vicinity of the vehicle; determining that the host vehicle is travelling on a collision course with the target; detecting a user initiated steering action for steering the vehicle towards one side of the target; determining a degree of understeering of the host vehicle; when the degree of understeering exceeds a first understeering threshold, controlling a steering control system of the vehicle to counteract the user initiated steering action to thereby reduce the degree of understeering.

The present invention is based on the realization that drivers often over-react when attempting to steer away to avoid collision with a target. This often leads to understeering of the vehicle, in particular on low friction roads. The present invention is thus based on the realization to counteract the user initiated steering action to thereby prevent the understeering such that the vehicle may safely be driven past the target. In other words, the user initiated steering action is effectively reduced or damped by the counteracting steering provided by the steering system.

Accordingly, with the inventive concept, for an over-reacting driver who steers too much at an evasive maneuver, instead of adding steering torque, the user initialed steering action is counteracted.

According to one embodiment, determining the time duration of the understeering, wherein counteracting the user initiated steering action is only performed when the time duration of the understeering has exceeded a first threshold time duration. For safety reasons, it is desirable to prevent accidental activation of the counteracting steering. Therefore, it is advantageous to require that the understeering has been occurring for at least a threshold time duration before the counteracting steering is performed.

According to one embodiment, counteracting the user initiated steering action may only be performed as long as the time duration of the understeering is within a second threshold time duration which exceeds the first threshold time duration. For functional safety reasons, it is advantageous to not allow the counteracting steering to be active for too long. Therefore, a time-out limit is set by the second threshold time duration.

According to one embodiment, determining a stability parameter value indicative of the driving stability of the host vehicle, wherein counteracting the user initiated steering action is only performed when the stability parameter value indicates that the host vehicle is stable. The stability parameter may indicate a tire slip below a threshold value, preferably in the linear regime, i.e. that the vehicle is not "skidding". The slip angle is the angle between the travel direction of the tire contact patch and the wheel hub direction (i.e. the pointing direction of the wheel). The slip angle may be measured for one of the rear axle wheels of the vehicle. Another possible stability indicator is the yaw rate, i.e. rotational speed about the vertical axis. A yaw rate that exceeds a threshold may indicate an unstable vehicle condition.

According to one embodiment, the degree of understeering may be a deviation between a calculated reference steering angle determined from a model, and a measured actual steering angle of the host vehicle.

According to one embodiment, determining vehicle specific parameters and vehicle driving parameters, and calculating the reference steering angle based on the vehicle specific parameters, the vehicle driving parameters, and the vehicle model.

The reference steering angle is the desired steering angle. The reference steering angle may be calculated by a mathematical algorithm that includes a vehicle model. Typically, vehicle driving parameters such as vehicle speed and yaw rate/lateral acceleration are measured and used as input to the algorithm. Vehicle specific parameters such as vehicle mass and tire cornering stiffness may be estimated or retrieved elsewhere, e.g. from a vehicle parameter and state online estimation system on board.

The algorithm estimates the steering angle based on the vehicle model and the parameters.

The measured steering angle is the actual steering angle. This angle is typically measured at the steering column with a steering angle sensor or/and the pinion angle through an electrical power assisted steering system of the vehicle.

The vehicle model may be the bicycle model which is assumed to be known per se.

According to one embodiment, a steering torque for the counteracting steering action may be determined based on the deviation between the calculated reference steering angle and the measured actual steering angle. Accordingly, the steering torque for the counteracting steering action may be determined based on steering angles which are readily available directly related to the degree of understeering. The deviation between the calculated reference steering angle and the measured actual steering angle is a measure of the present degree of understeering.

According to one embodiment, the steering torque for the counteracting steering action may be proportional to the deviation between the calculated reference steering angle and the measured actual steering angle.

According to one embodiment, the degree of understeering may be based on the understeering gradient. Thereby an understeering situation may be captured sooner compared to using the absolute understeering to judge the degree of understeering.

According to one embodiment, when the degree of understeering is subsequently determined to be below a second understeering threshold which is lower than the first understeer threshold, controlling the steering control system to stop providing the counteracting steering action. The counteracting steering torque may be deactivated when the degree of understeer is determined to be below a threshold and the driver may control the vehicle by himself/herself.

According to a second aspect of the invention, there is provided an evasive steering system configured to provide an intervening action for a host vehicle for avoiding a collision with a target, the evasive steering system comprises: a driving environment detection unit configured to detect a target in the vicinity of the host vehicle; a collision determining unit configured to determine that the host vehicle is on collision course with the target; a steering control system configured to control a steering torque of the host vehicle; and a vehicle control unit configured to: detect a user initiated steering action for steering the vehicle towards one side of the target; determine a degree of understeering of the host vehicle; when the degree of understeering exceeds a threshold, control the steering control system of the vehicle to counteract the user initiated steering action to thereby reduce the degree of understeering.

According to one embodiment, the system may comprise a vehicle stability measuring unit configured to determine a stability parameter value indicative of the driving stability of the host vehicle, wherein the vehicle control unit is configured to control the steering control system to counteract the user initiated steering action only when the stability parameter value indicates that the host vehicle is stable.

According to one embodiment, the system may comprise a steering angle sensor for measuring an actual steering angle of the host vehicle, wherein the vehicle control unit is configured to: calculate the degree of understeer based on a deviation between a calculated reference steering angle determined from a model, and the measured actual steering angle.

According to one embodiment, the vehicle control unit is configured to: determine a steering torque for the counteracting steering action based on the deviation between the calculated reference steering angle and the measured actual steering angle.

Effects and features of the second aspect of the invention are largely analogous to those described above in connection with the first aspect of the invention.

There is further provided a vehicle comprising the evasive steering system according to any embodiment of the second aspect.

A control unit may include at least one microprocessor, microcontroller, programmable digital signal processor or another programmable device.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXAMPLE EMBODIMENTS

In the present detailed description, various embodiments of the system and method according to the present invention are described. However, this invention may be embodied in many different forms and should not be construed as limited to the embodiments set forth herein; rather, these embodiments are provided for thoroughness and completeness, and fully convey the scope of the invention to the skilled person. Like reference characters refer to like elements throughout.

Figure 1:
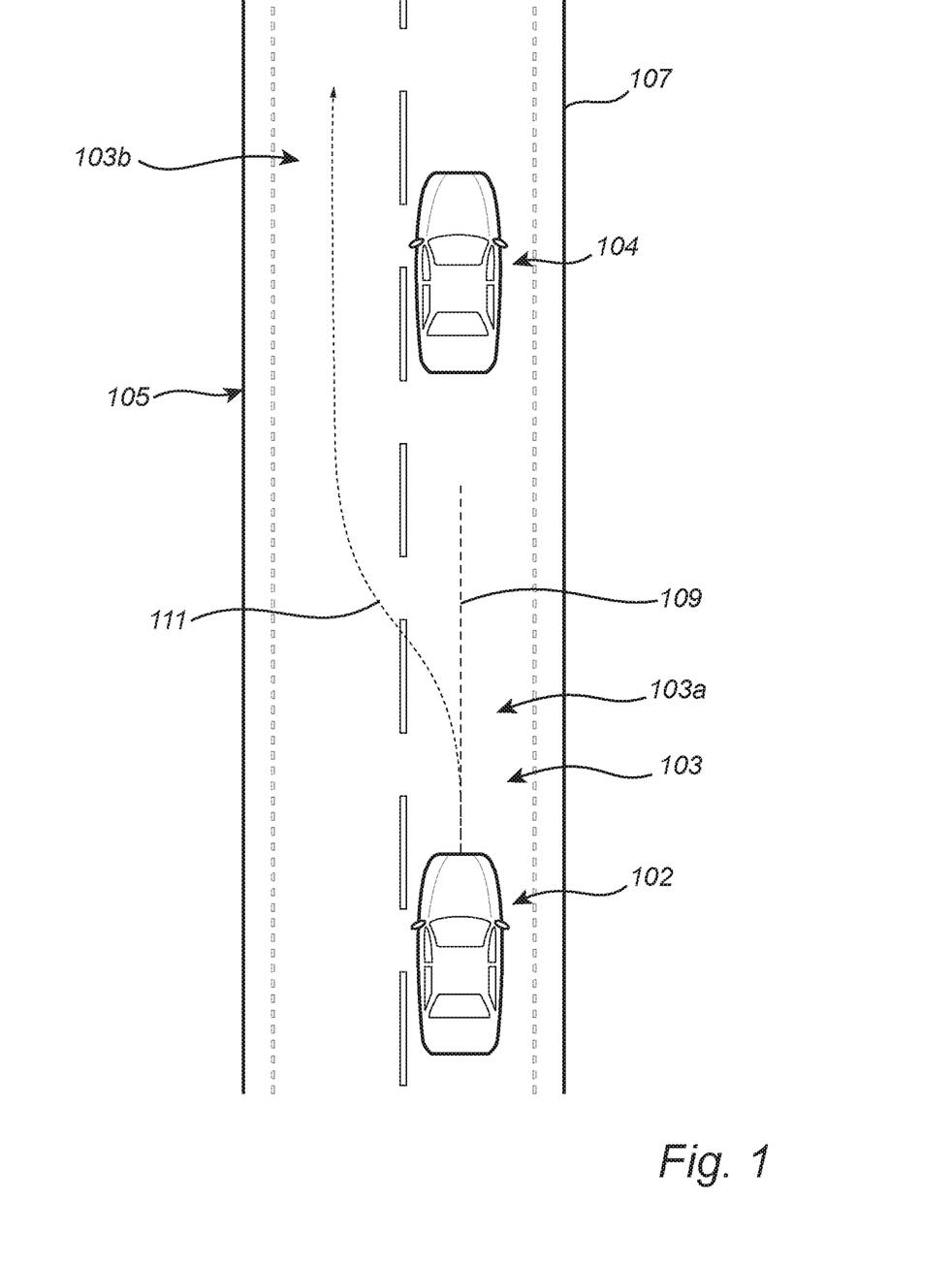
FIG. 1 illustrates a host vehicle approaching a target vehicle.

FIG. 1 illustrates a schematic overview of exemplifying a host vehicle 102 approaching a target 104 from behind travelling on a road 103. The road is delimited by outer edges 105 and 107, which may be lane markers. The road is here shown to have two lanes, the lane 103a on which the target 104 and the host vehicle 102 are travelling, and an opposing lane 103b. The target is here a target vehicle 104.

The host vehicle 102 approaches the vehicle at a relatively high speed and risks colliding with the target vehicle 104. The driver of the host vehicle 102 may attempt to brake only thus continue on its original course 109. However, depending on the driving conditions such as e.g. whether and road surface condition this approach may not be efficient for avoiding a collision.

Another approach is to attempt pursuing course 111 and thus steer to the side of the target vehicle 104, with or without braking. The above two approaches will now be briefly discussed.

Figure 2A:
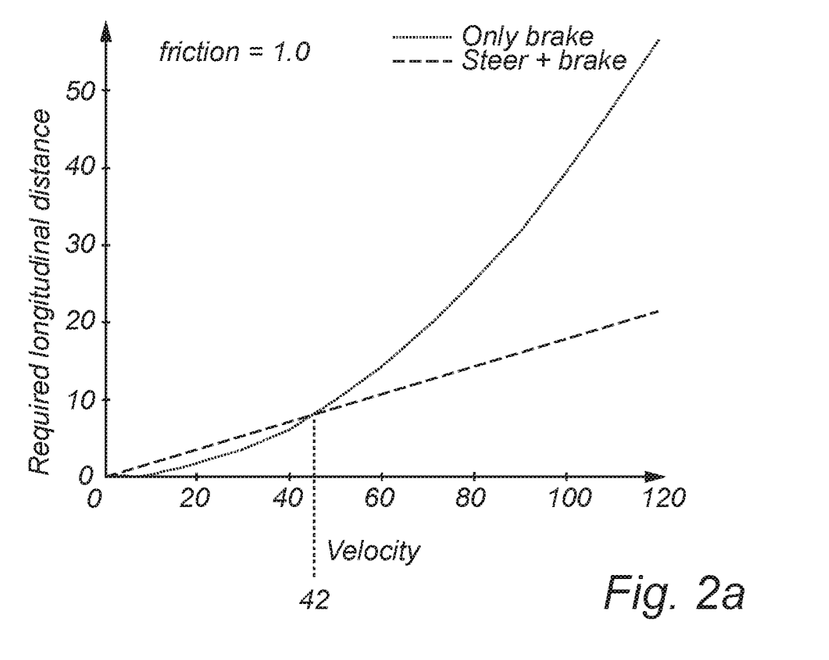
FIG. 2a-c are graphs illustrating required longitudinal distance to come to complete rest versus velocity for different friction conditions.
Figure 2B:
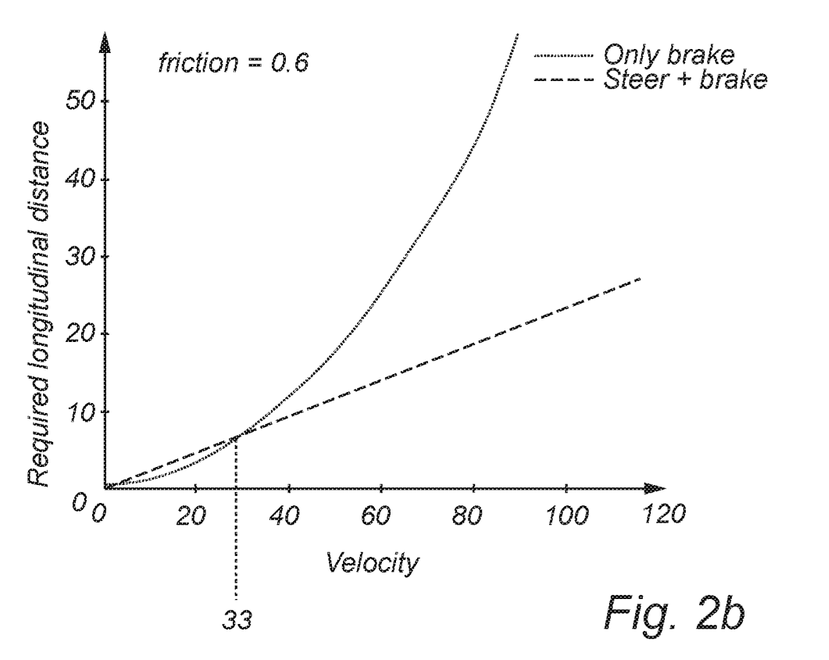
Figure 2C:
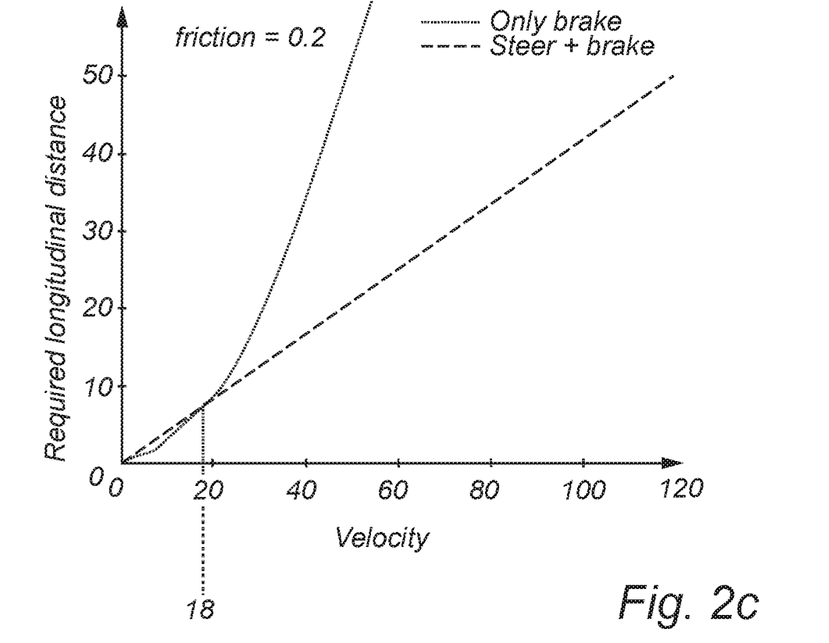

FIG. 2a-c are graphs showing the required longitudinal distance to come to complete rest versus velocity for different friction between the road surface and the vehicle tires. FIG. 2a represents a relative friction of 1, FIG. 2b represents relative friction of 0.6, and FIG. 2c represents relative friction of 0.2.

In each graph there are two curves, one representing braking only (solid), and the other one represents braking combined with steering (dashed).

In FIG. 2a the curves cross at approximately 42 km/h, whereby for velocities higher than 42 km/h, the required longitudinal distance to come to complete rest by braking only (solid) exceed that of a combined braking and steering (dashed). For lower friction, e.g. 0.6 as represented by FIG. 2b, the cross-over is for an even lower velocity at 33 km/h. Furthermore, for even lower friction such as 0.2 represented by FIG. 2c, the cross-over is for an even further lower velocity at 18 km/h.

Accordingly, from FIG. 2a-c one can draw the conclusion that for slippery roads, including a steering action in the evasive maneuver is more efficient than a sole braking action for avoiding collisions with a target ahead of the host vehicle.

However, the efficiency of steering to the side of the target, as suggested by course 111 in FIG. 1, is dependent on the lateral tire force on the tires of the host vehicle.

Figure 3:
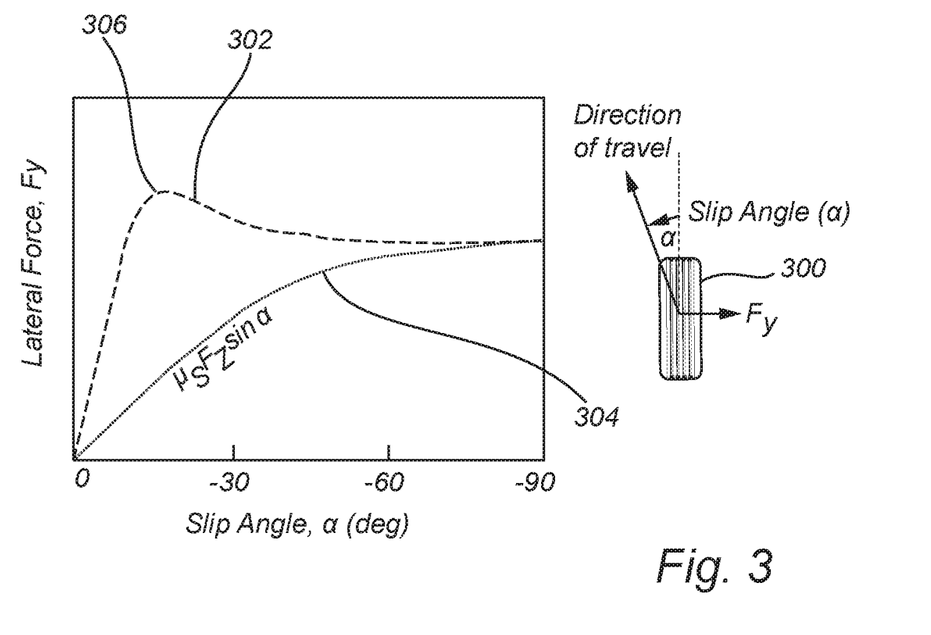
FIG. 3 illustrates lateral tire force versus tire slip angle.

FIG. 3 illustrates the lateral tire force ($F_y$) Vs. the tire slip angle (a) for rolling wheel in dashed curve 302, and for a locked wheel in curve 304. The slip angle (a) is the angle between the direction of travel and the wheel hub pointing direction as illustrated on schematic tire 300 shown in FIG. 3.

For a locked wheel, the lateral force may be given by the expression $\mu_s F_z \sin(\alpha)$, where $\mu_s$ is the friction coefficient and the $F_z$ is the normal force between the tire and road surface.

The rolling wheel curve 302 (dashed) shows that the lateral force $F_y$ saturates relatively quickly at the peak 306. For larger slip angles the lateral force $F_y$ decreases which indicates that the grip between the tire and the road surface is decreasing. For large slip angles the lateral force for a rolling tire approaches that of a locked wheel.

Thus since the tire lateral force saturates rapidly, more steering gives excessive tire side slip angle, and understeer. This will results in less lateral acceleration and thus less lateral displacement of the vehicle and consequently an increased risk to crash with the target in front. The invention alleviates the above-mentioned problematic driving situation.

Figure 4:
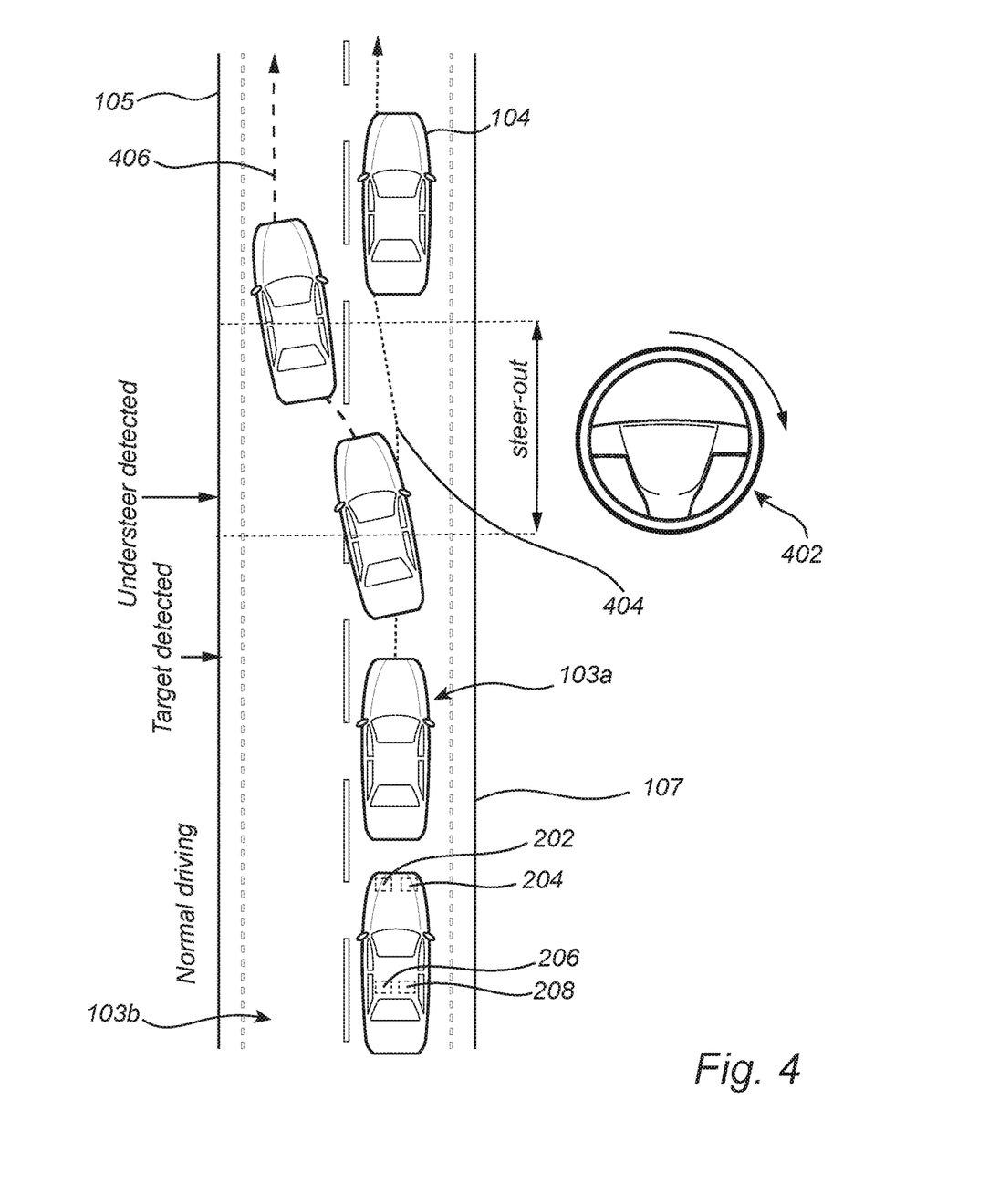
FIG. 4 illustrates a schematic overview of exemplifying application of embodiments of the invention.

FIG. 4 illustrates a schematic overview of exemplifying application of embodiments of the invention. An evasive steering system is comprised in a host vehicle 100 here shown travelling on a road 103. The road is delimited by outer edges 105 and 107. The road is here shown to have two lanes, the lane 103a which is the ego-lane of the host vehicle 102 and an opposing lane 103b.

The host vehicle 102 comprises a driving environment detection unit 202 configured to detect a target 104 in the vicinity of the host vehicle 102. The host vehicle 102 further comprises a collision determining unit 204 configured to determine that the host vehicle is on collision course with the target 104 and a steering control system 206 configured to control a steering torque of the host vehicle.

The host vehicle 102 further comprises a vehicle control unit 208. The vehicle control unit 208 receives information that the host vehicle 102 is on collision course with the target vehicle 104 from the collision determining unit 204. The control unit next detects a user initiated steering action for the steering the host vehicle 102 to the side of the target vehicle 104 for avoiding a collision. The user initiated steering action initiates the steer-out phase indicated in FIG. 4.

Next, the control unit 208 determines the present degree of understeer of the host vehicle 102 resulting from the steering action by the driver. Determining the present degree of understeer may be performed by calculating a deviation between a calculated reference steering angle determined from a model, and the measured actual steering angle.

The reference steering angle is the desired steering angle. The reference steering angle may be calculated by a mathematical algorithm that includes a vehicle model. Typically, vehicle driving parameters such as vehicle speed and yaw rate/lateral acceleration are measured and used as input to the algorithm. Vehicle specific parameters such as vehicle mass and tyre cornering stiffness may be estimated or retrieved elsewhere. The algorithm estimates the steering angle based on the vehicle model and the parameters.

The measured steering angle is the actual one steering angle. This angle is typically measured at the steering column with a steering angle sensor or/and the pinion angle through an electrical power assisted steering system of the vehicle. The host vehicle may comprise a steering angle sensor (not shown) for measuring an actual steering angle of the host vehicle.

When the vehicle control unit 208 determines that the degree of understeer exceeds a threshold, the vehicle control unit 208 controls the steering control system to counteract the user initiated steering action, as indicated by the steering wheel 402 and the conceptually shown rotational direction of the steering wheel 402 in the clockwise direction.

Accordingly, as the host vehicle 102 is approaching the target 104 and the driver attempts to steer to the side, i.e. as indicated by the steer-out phase, the steering may be too excessive a lead to loss in lateral wheel force and understeer. This leads to a course 404 and an impending collision with the target 104.

However, with the evasive steering system, the excessive steering is counteracted by a steering torque overlay as indicated by the steering wheel 402 and the conceptually shown rotational direction of the steering wheel 402. This leads to a recover in lateral wheel force and to reduced understeering and consequently improved path and stability control of the vehicle. Consequently, the host vehicle 102 may be steered back to travel along the safe path 406. During the steering back phase, stability control systems of the vehicle may provide additional steering control of the vehicle in order to prevent unstable driving such as over-steering etc.

Figure 5:
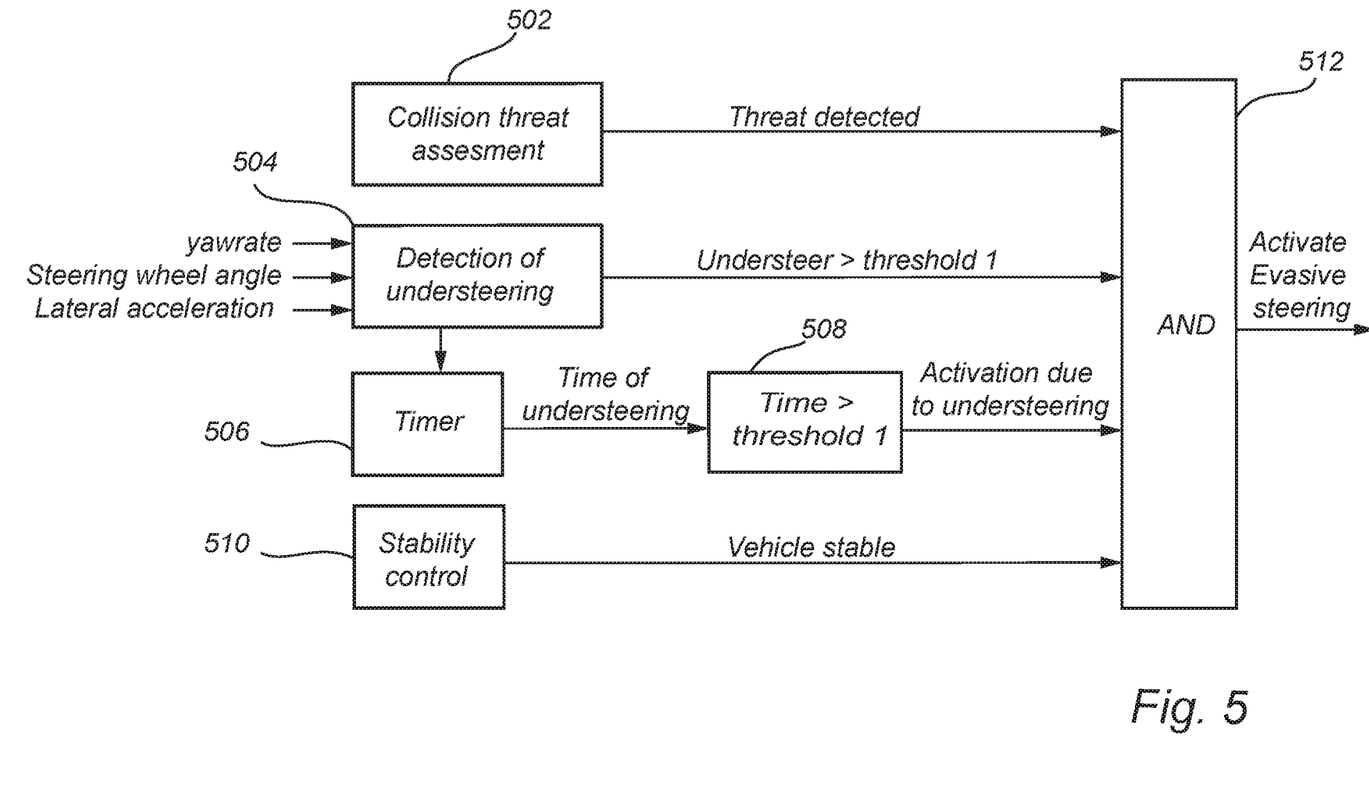
FIG. 5 shows a functional box diagram for embodiments of the invention.

FIG. 5 shows a functional box diagram for embodiments of the invention. Box 502 represents a collision threat assessment, i.e. to determine that a collision is impending. Furthermore, box 504 represents the detection of understeering which may be based on various parameters, including lateral acceleration, steering wheel angle, vehicle yaw rate, etc. It is determined whether or not the understeer is above a first threshold degree of understeering. Furthermore, a timer 506 may determine the time lapse of the understeering and check the time lapse against a threshold time duration as indicated in box 508.

In some embodiments, a vehicle stability measuring unit functionally represented by 510 may determine that the vehicle is stable.

As indicated by the conceptual AND-gate 512, the evasive steering function, i.e. to counteract the driver initiated steering action is only activated when a threat is detected, and understeer exceeds the threshold, and the time lapse of the understeer exceeds a threshold time duration, and the vehicle is stable.

Figure 6:
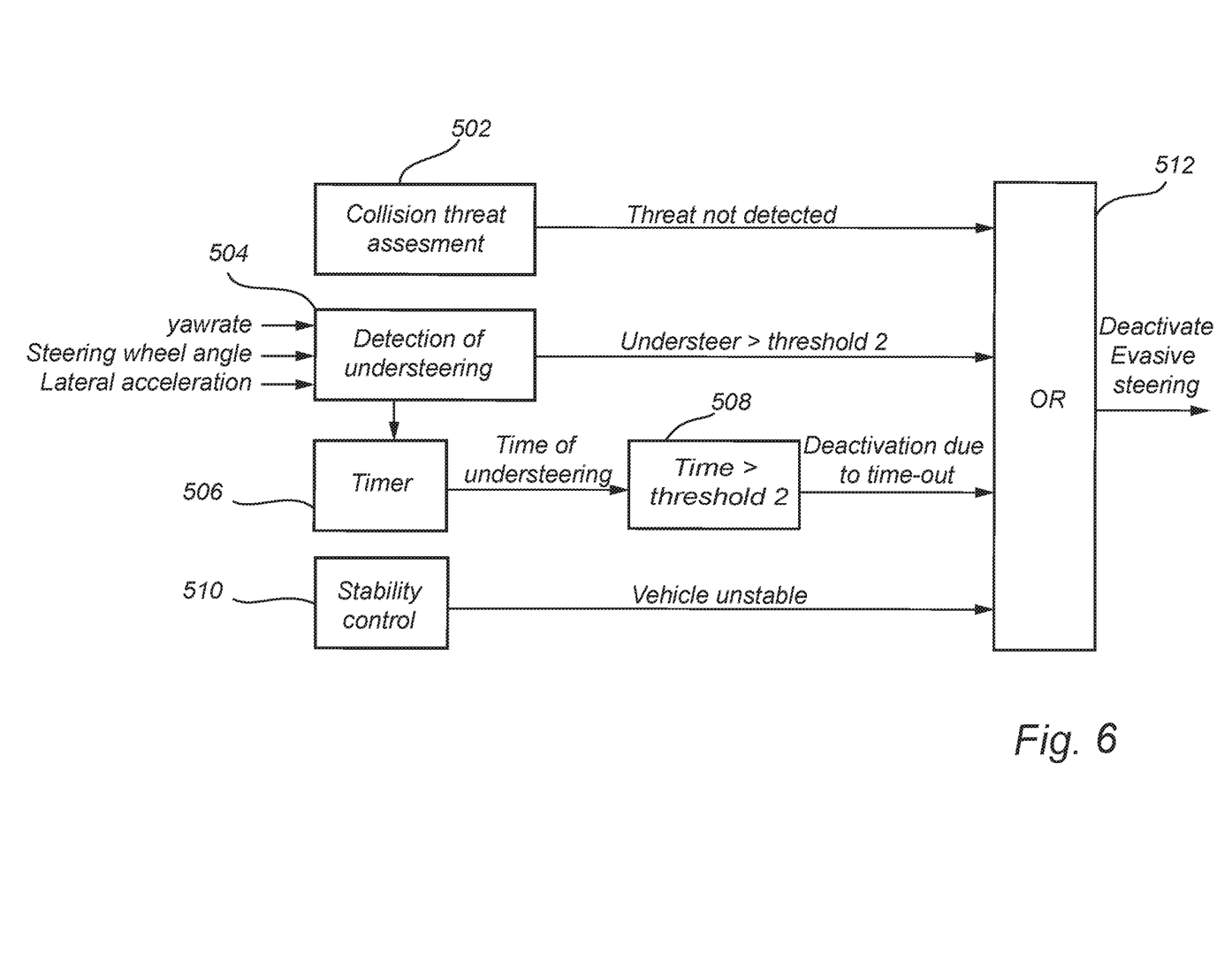
FIG. 6 shows a functional box diagram for embodiments of the invention.

FIG. 6 shows a functional box diagram for embodiments of the invention. In FIG. 6, deactivation of the evasive steering system is functionally exemplified.

As indicated by the conceptual OR-gate 514, the evasive steering function, i.e. to counteract the driver initiated steering action is deactivated when either a threat is not detected, or understeer is below a second understeer threshold, or the time lapse of the understeer exceeds a second threshold time duration, or the vehicle is unstable. The second threshold time duration is a time-out limit for ensuring that the counteracting steering is not active for too long. Furthermore, the second understeer threshold is lower the first understeer threshold in order to ensure that the driver may safely control the vehicle himself/herself.

Figure 7:
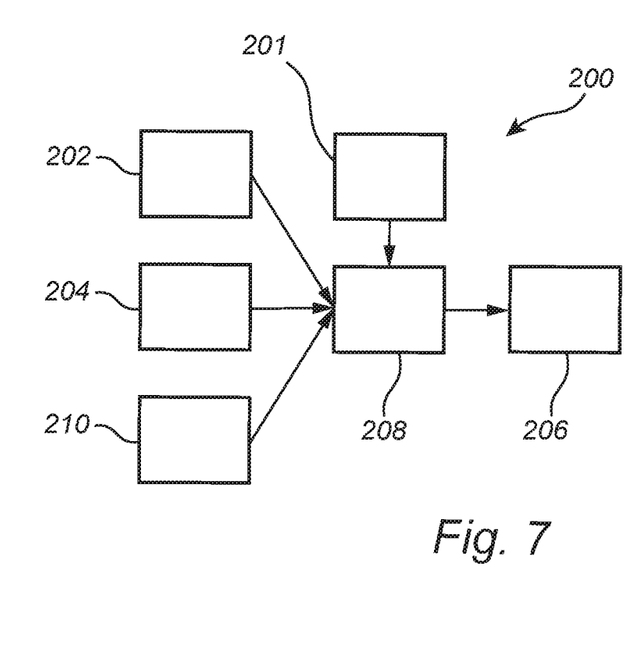
FIG. 7 is a box diagram of an evasive steering system according to embodiments of the invention.

FIG. 7 is a box diagram of an evasive steering system 200 according to embodiments of the invention. The evasive steering system 200 comprises a driving environment detection unit 202 configured to detect a target in the vicinity of the host vehicle.

Moreover, the system 200 comprises a collision determining unit 204 configure to determine that the host vehicle is on collision course with the target. The collision determining unit 204 may comprise a processor or control unit, for example part of the vehicle control unit 208 or part of another safety system of the vehicle used for predicting collision. The collision determining unit 204 may provide a signal to the vehicle control unit 208 that the host vehicle is on collision course with a target.

A steering control system 206 comprised in the system 200 is configured to control the curvature of the host vehicle, by applying a steering torque overlay. The steering toque is used for turning the steerable wheels of the vehicle to a desirable wheel angle which corresponds to the desired curvature. The steering control system 206 is controlled by the vehicle control unit 208.

In some embodiments, the evasive steering system 200 comprises a vehicle stability measuring unit 210 configured to determine a stability parameter value indicative of the driving stability of the vehicle. The vehicle control unit 208 is configured to provide the intervening action only when the host vehicle is determined to be stable.

The steering control system 206 may comprise an electrically powered assisted steering system. Thus, the vehicle control unit 208 may request a steering torque to be added to the steering system by the electrically powered assisted steering system. The requested steering torque overlay ($T_{steer}$) may be given by:

$$T_{steer}=K_p(A_{ref}-A_{actual})$$

where $K_{fb}$ is a feedback gain factor and is a tunable constant, $A_{ref}$ is a reference steering angle which is calculated with regards to the required steering profile to counteract the driver initiated steering action, and $A_{actual}$ is the present actual steering angle.

Accordingly, the steering control system 206 comprised in the system 200 is configured to applying a steering torque overlay. The steering torque overlay is used for turning the steerable wheels of the vehicle to a desirable wheel angle to counteract the user initiated steering action.

The steering control system 206 may comprise a controller which calculates the reference steering angle using e.g. a vehicle model. In addition, the steering control system 206 may comprise an electric machine to provide the steering torque.

In addition, the evasive steering system 200 may optionally comprise vehicle to vehicle communication units, and/or vehicle to infrastructure communication units, and/or vehicle to device communication units, i.e. communication units 201 generally known as V2X communication with the "cloud" via a server in order to gain information of the presence of other vehicles or objects in order to improve the detection capability of nearby vehicles.

Figure 8:
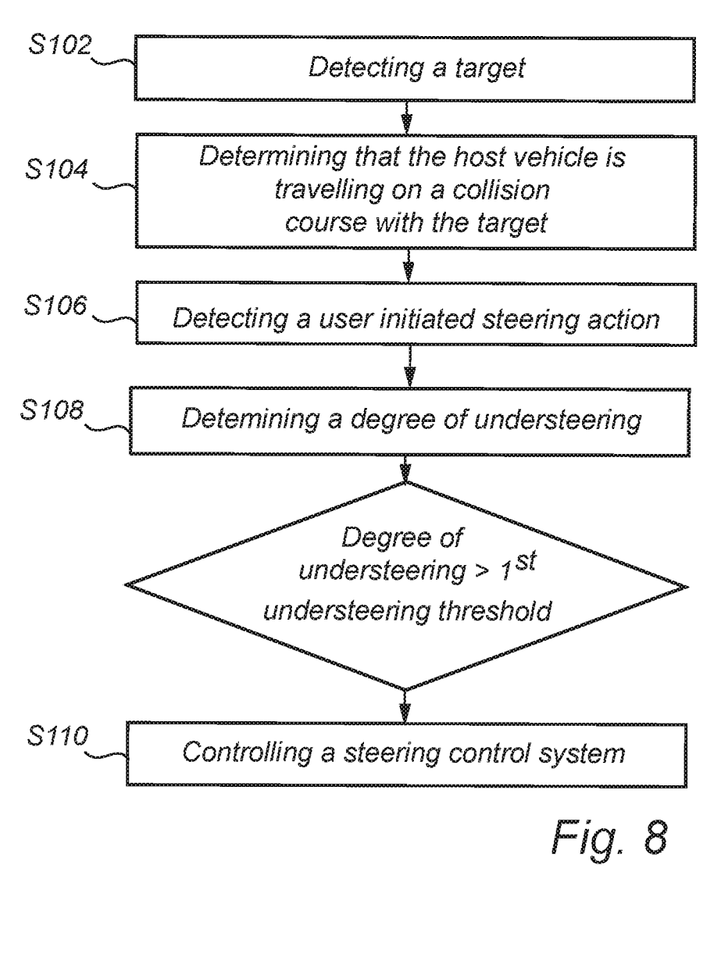
FIG. 8 is a flow-chart of method steps according to embodiments of the invention.

FIG. 8 is a flow-chart of method steps according to embodiments of the invention. In step S102 is a target in the vicinity of the vehicle detected. Subsequently, in step S104 it is determined that the host vehicle is travelling on a collision course with the target. A user initiated steering action for steering the vehicle towards one side of the target is detected in step S106. As the driver steers the vehicle a degree of understeering of the host vehicle is determined in step S108. When the degree of understeering exceeds a first understeering threshold, controlling a steering control system of the vehicle to counteract the user initiated steering action to thereby reduce the degree of understeering in step S110.

A vehicle in accordance with the invention may be any vehicle operative on a road, such as a car, a truck, a lorry, a bus, etc.

The vehicle control unit may include a microprocessor, microcontroller, programmable digital signal processor or another programmable device. The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method for collision avoidance for a host vehicle, the method comprising:
    detecting a target in the vicinity of the host vehicle;
    determining a threat in that the host vehicle is travelling on a collision course with the target;
    detecting a user initiated steering action for steering the host vehicle towards one side of the target;
    determining a degree of understeering of the host vehicle resulting from the user initiated steering action and a time duration of the understeering, wherein the degree of understeering is caused by overreactive user initiated steering action;
    determining a stability parameter value indicative of a driving stability of the host vehicle prior to application of a steering torque overlay by a steering control system of the host vehicle to thereby reduce the degree of understeering;
    when the degree of understeering exceeds a first understeering threshold, controlling the steering control system to counteract the user initiated steering action by applying the steering torque overlay to thereby reduce the degree of understeering and dampen the overreactive user initiated steering action only when:
        the threat is determined,
        when the time duration of the understeering exceeds a first threshold time duration and as long as the time duration of the understeering is within a second threshold time duration that exceeds the first threshold time duration, and
        when the stability parameter value indicates that the host vehicle is stable; and
    deactivating the steering control system to stop providing the steering torque overlay when the threat is not determined, or the degree of understeering is below a second understeering threshold lower than the first understeering threshold, or the time duration of the understeering exceeds the second threshold time duration, or the stability parameter value indicates that the host vehicle is unstable.

2. The method according to claim 1, wherein the degree of understeering is a deviation between a calculated reference steering angle determined from a vehicle model, and a measured actual steering angle of the host vehicle.

3. The method according to claim 2, comprising:
    determining vehicle specific parameters and vehicle driving parameters, and
    calculating the reference steering angle based on the vehicle specific parameters, the vehicle driving parameters, and the vehicle model.

4. The method according to claim 2, wherein a steering torque for the counteracting steering action is determined based on the deviation between the calculated reference steering angle and the measured actual steering angle.

5. The method according to claim 4, wherein the steering torque for the counteracting steering action is proportional to the deviation between the calculated reference steering angle and the measured actual steering angle.

6. The method according to claim 1, wherein the degree of understeering is based on the understeering gradient.

7. The method according to claim 1, wherein when the degree of understeer is subsequently determined to be below a second understeering threshold which is lower than the first understeer threshold, controlling the steering control system to stop providing the counteracting steering action.

8. An evasive steering system configured to provide an intervening action for a host vehicle for avoiding a collision with a target, the evasive steering system comprising:
    a driving environment detection unit comprising a processor executing instructions stored in a memory configured to detect a target in the vicinity of the host vehicle;
    a collision determining unit comprising a processor executing instructions stored in a memory configured to determine a threat in that the host vehicle is on collision course with the target;
    a steering control system configured to control a steering torque of the host vehicle;
    a vehicle stability measuring unit comprising a processor executing instructions stored in a memory configured to determine a stability parameter value indicative of a driving stability of the host vehicle prior to application of a steering torque overlay by the steering control system to thereby reduce a degree of understeering of the host vehicle resulting from a user initiated steering action; and
    a vehicle control unit configured to:
        detect the user initiated steering action for steering the host vehicle towards one side of the target;
        determine the degree of understeering of the host vehicle resulting from the user initiated steering action and a time duration of the understeering, wherein the degree of understeering is caused by overreactive user initiated steering action;
        when the degree of understeering exceeds a first understeering threshold, control the steering control system to counteract the user initiated steering action by applying the steering torque overlay to thereby reduce the degree of understeering and dampen the overreactive user initiated steering action only when:
            the threat is determined,
            when the time duration of the understeering exceeds a first threshold time duration and as long as the time duration of the understeering is within a second threshold time duration that exceeds the first threshold time duration, and
            when the stability parameter value indicates that the host vehicle is stable; and
        deactivate the steering control system to stop providing the steering torque overlay when the threat is not determined, or the degree of understeering is below a second understeering threshold lower than the first understeering threshold, or the time duration of the understeering exceeds the second threshold time duration, or the stability parameter value indicates that the host vehicle is unstable.

9. The evasive steering system according to claim 8, comprising a steering angle sensor for measuring an actual steering angle of the host vehicle, wherein the vehicle control unit is configured to:

calculate the degree of understeer based on a deviation between a calculated reference steering angle determined from a model, and the measured actual steering angle.

10. The evasive steering system according to claim 8, wherein the vehicle control unit is configured to:
determine a steering torque for the counteracting steering action based on the deviation between the calculated reference steering angle and the measured actual steering angle.

11. A vehicle comprising the evasive steering system according to claim 8.

\* \* \* \* \*